(12) United States Patent
Piehl et al.

(10) Patent No.: US 7,894,525 B2
(45) Date of Patent: Feb. 22, 2011

(54) METHOD FOR COMPRESSING VIDEO INFORMATION

(75) Inventors: Erik Piehl, Helsinki (FI); Sami Sallinen, Espoo (FI)

(73) Assignee: Oy Gamecluster Ltd., Helsinki (FI)

( * ) Notice: Subject to any disclaimer, the term of this patent is extended or adjusted under 35 U.S.C. 154(b) by 2009 days.

(21) Appl. No.: 10/470,084

(22) PCT Filed: Jan. 23, 2002

(86) PCT No.: PCT/FI02/00050

§ 371 (c)(1),
(2), (4) Date: Dec. 10, 2003

(87) PCT Pub. No.: WO02/060183

PCT Pub. Date: Aug. 1, 2002

(65) Prior Publication Data

US 2004/0095999 A1    May 20, 2004

(30) Foreign Application Priority Data

Jan. 24, 2001    (FI)    ................................. 20010143

(51) Int. Cl.
*H04N 7/12*    (2006.01)
(52) U.S. Cl. ............................ 375/240.16; 375/240.12; 375/135; 375/136; 375/137; 348/452
(58) Field of Classification Search ................. 348/452; 375/240.16, 135–137
See application file for complete search history.

(56) References Cited

U.S. PATENT DOCUMENTS

| | | | | |
|---|---|---|---|---|
| 5,259,040 A * | 11/1993 | Hanna | ........................ | 382/107 |
| 5,511,153 A | 4/1996 | Azarbayejani et al. | | |
| 5,617,334 A * | 4/1997 | Tseng et al. | ................. | 708/203 |
| 5,784,115 A * | 7/1998 | Bozdagi | ..................... | 348/452 |
| 5,847,776 A | 12/1998 | Khmelnitsky et al. | | |
| 5,986,668 A * | 11/1999 | Szeliski et al. | .............. | 345/634 |
| 6,031,538 A * | 2/2000 | Chupeau et al. | ............. | 345/419 |

(Continued)

FOREIGN PATENT DOCUMENTS

JP    7287775 A    10/1995

(Continued)

OTHER PUBLICATIONS

Yannick Nicolas & Philippe Robert, "Definition and construction of a compact representation of image sequences", (2000) In Visual COmmunications and Image Processing 2000, Proceedings of SPIE vol. 4067.*

(Continued)

*Primary Examiner*—Tung Vo
*Assistant Examiner*—Anner Holder
(74) *Attorney, Agent, or Firm*—McDermott Will & Emery LLP

(57) ABSTRACT

A method (800, 820 ), device (900 ) and program product for compression video information is presented. The method comprises the following steps: projecting (803 ) points of a next image to a three-dimensional space using camera parameters and depth map and projecting (805 ) projected points from the three-dimensional space to reference image surface, thereby obtaining motion vectors for estimating changes between the next image and the reference image.

16 Claims, 8 Drawing Sheets

U.S. PATENT DOCUMENTS

Figure 1A:
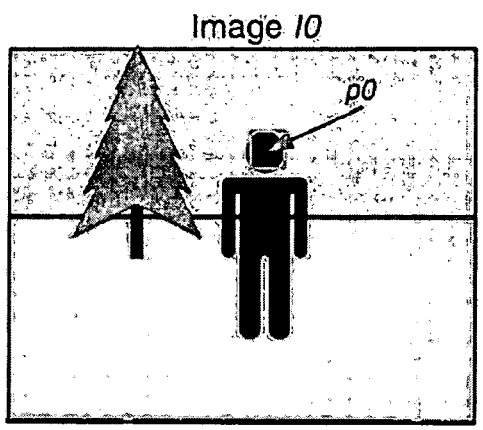

| | | | |
|---|---|---|---|
| 6,055,330 | A | 4/2000 | Eleftheriadis et al. |
| 6,111,979 | A * | 8/2000 | Katto .......................... 382/154 |
| 6,351,572 | B1 * | 2/2002 | Dufour ....................... 382/285 |
| 6,411,326 | B1 * | 6/2002 | Tabata ......................... 348/47 |
| 6,556,704 | B1 * | 4/2003 | Chen ........................... 382/154 |
| 6,664,962 | B1 * | 12/2003 | Komsthoeft et al. ........ 345/426 |
| 6,791,540 | B1 * | 9/2004 | Baumberg ................... 345/419 |
| 7,139,423 | B1 * | 11/2006 | Nicolas et al. .............. 382/154 |

FOREIGN PATENT DOCUMENTS

| | | | |
|---|---|---|---|
| JP | | 9330267 A | 12/1997 |
| WO | | WO 01/22366 A1 | 3/2001 |

OTHER PUBLICATIONS

Alatan, A. Aydin et al.: Estimation of Depth Fields Suitable for Video Compression Based on 3-D Structure and Motion of Objects. IEEE Transaction on Image Processing, vol. 7, No. 6, June 1998, pp. 904-908. retrieved from http://ieeexplore.ieee.org.

Martins, Fernando C. M.: et al.: 3-D Video Compositing: Towards a Compact Representation for Video Sequences. Image Processing, 1995. Proceedings., International Conference on, vol. 1, 1995, pp. 550-553 vol. 1, retrieved from http://ieeexplore.ieee.org/.

* cited by examiner

METHOD FOR COMPRESSING VIDEO INFORMATION

RELATED APPLICATIONS

This application is the U.S. National Phase under 35 U.S.C. §371 of International Application No. PCT/FI02/00050, filed on Jan. 23, 2002, which in turn claims the benefit of Finnish Application No. 2001-0143, filed on Jan. 24, 2001, the disclosures of which Applications are each incorporated by reference herein in their entireties.

The invention relates to a method for compressing digital video. The method is applicable especially for speeding up the compression of digital video and/or enhancing the quality of the result. The invention is furthermore especially suitable for cases where the video material is synthetically generated from three-dimensional models.

Moving video consists of individual still pictures that are shown to the viewer successively at a high enough rate to generate the sensation of motion. The goal of video compression is to diminish the amount of data required to describe a moving video image, when information about the moving video image is stored or transmitted.

All known video compression methods in common use today principally achieve this goal by identifying and removing repetitive information from the pictures. Practically this means that changes between pictures are identified and the receiver is told how to construct the next image by using the previous one (or some other earlier compressed image) as a reference.

One method of constructing a new image based on previous ones is to identify how parts of the image have moved between the reference image and the next image. The process of finding the movement parameters is called Motion Estimation, and it is usually done on a block-by-block basis by searching similar blocks in nearby areas of the reference image. The images are typically partitioned into blocks in a certain fixed way, but the partitioning (i.e. block sizes and arrangement of blocks) may be done alternatively, for example, simultaneously with the Motion Estimation, thus taking into account the detected movements in the partitioning. The decompressor is then told the direction and length of the movement of blocks in the next image using a Motion Vector. Information about block partitioning and motion vectors of the blocks allows the decompressor to produce an estimate of the original next image using an earlier reconstructed reference image. This action by the decompressor is called Motion Compensation, and in the motion compensated estimate of the next image the movement on the original next image is mimicked.

The motion compensation usually does not produce an exact copy of the next image, so a correction to the motion compensated image is created by the image compressor. Typically the compressor determines the correction image as difference between the motion compensated estimate and the original next image. This correction image is called the Difference Image.

Motion estimation on the compressor side requires an iterative search in a two-dimensional search space. In most standardized video compression algorithms a block of the next image is taken and it is then compared to nearby blocks in the reference image. The location difference between the most similar block found and the searched block is then assumed to be the motion vector. Due to the high amount of operations required in the iterative search process, an exhaustive search for the ideal motion vector is not practical in current computer or hardware video compression systems.

Currently available video compression systems try to avoid the high computational load by using several clever techniques and by making some compromises. One such method is to limit the area from which the search is made, thus also limiting the maximum motion vector length that can be expressed. Another one is to estimate the motion vector of a block based on the motion vector of neighbour blocks. These methods, however, compromise the efficiency and quality of the compression process.

An object of this invention is to create an efficient method for video compression. Preferably the method allows compressing video markedly more efficiently than the currently known methods without compromising quality.

These and other objects of the invention are achieved by determining motion vectors caused by the movements of the camera for using these motion vectors in video compression.

A method according to the invention is characterized by that which is stated in the characterising portion of the independent claim directed to a method. A computer program according to the invention is characterized by that which is stated in the independent claim directed to a computer program. A device for compressing video information according to the invention is characterized by that which is stated in the characterising portion of the independent claim directed to such a device.

The dependent claims describe some preferred embodiments of the invention.

The basic principle of the invention is that when the video to be compressed originates from a known synthetic model or when it is possible to create a depth-map model of the scene in the video new possibilities arise for the motion estimation process.

When a depth-map of the scene in the video is known, this means—intuitively—that it is possible to determine the locations of the objects, which are present in the scene, in a three-dimensional space. With more accurate terms, the points in the image surface are projected to the three-dimensional space. The three-dimensional space may correspond either to a synthetic model or to the real world. When the changes in the camera location and direction are known between a reference image and a next image, it is possible to determine from the movements of the camera and using the known locations of the objects in the three-dimensional space (or projections to the three-dimensional space) such motions vectors for the next image, which take into account the camera movements. If there are no other changes in the scene than those related to camera movements (that is, the objects are not moving between the time instances relating to the reference image and the next image), then these motion vectors describe accurately the next image in relation to the reference image.

The video images to be compressed may be images of the real three-dimensional world. In this case it is possible to determine or estimate the locations of the objects with respect to the camera, as an image itself reveals information about the locations of the objects projected to a plane and information about the distance of an object from a camera may be obtained, for example, using a range sensor. Alternatively, the video images may originate from a synthetic model. In computer graphics, when a view of a synthetic model is determined, it is necessary to find out, which objects in the model are visible to a viewer and which are not. Generally a z-buffer is used: a depth value (z-value) of each pixel to be displayed is stored to the z-buffer, and a new pixel is drawn only, if its z-value is smaller than the pixel already at the same location. The z-buffer is a depth-map of the view, and such a depth-map is typically generated each time a view of a synthetic model is produced in computer graphics.

The motion vectors relating to the camera movements may be determined for blocks and used directly as motion vectors of the blocks in video compression. Alternatively, the motion vectors relating to the camera movements may be used as initial values and more precise motion vectors for the blocks may be determined, for example, by searching a similar block nearby the area, to which the camera-movement motion vector points.

In addition to determining motion vectors for blocks in the next image, it is possible to determine a motion vector field for the next image. A motion vector field typically refers to motion vector information, which is on a finer scale than blocks. Motion vector field describes typically motion on pixel scale. The motion vector field may be determined directly on a pixel level similarly as for blocks. This is straightforward, as the depth map is typically defines distance information for image pixels. Alternatively, it is possible to determine a motion vector field on a block level, and using these block-specific motion vectors to interpolate pixel-specific motion vector field.

The motion vector field may be used as a reference image warping field. This means that in addition to plain translation a part of the reference image, also contraction/expansion and/or rotation of parts of the reference image are possible when forming the motion compensated estimate of the next image. Using motion vector field in motion compensation requires that the decompressor is able to generate a motion vector field from the information it receives and to warp the reference image in accordance with the reference image. A decompressor may use, for example, an interpolation method, which the decompressor indicates in the beginning of the compressed information flow or, alternatively, the compressor and decompressor may negotiate an interpolation method supported by both of them. Typically there is no need to change the interpolation method during the compression of a sequence of images, but this can be done, provided that the decompressor is informed about the new interpolation method.

For accuracy of the image reconstruction, a compressor typically does not use an earlier image as such as a reference image. Typically a compressor reconstructs a reference image using the same information as is available to the decompressor. This reconstructed reference image is then used in determining motion estimation and the correction image. Below in the detailed description of the invention, term reference image may be either an earlier original image as such or to a reconstructed earlier image, depending on the details of the image compression.

Figure 2A:
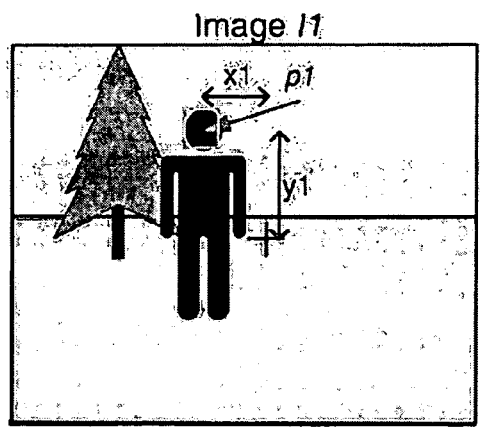
Figure 1B:
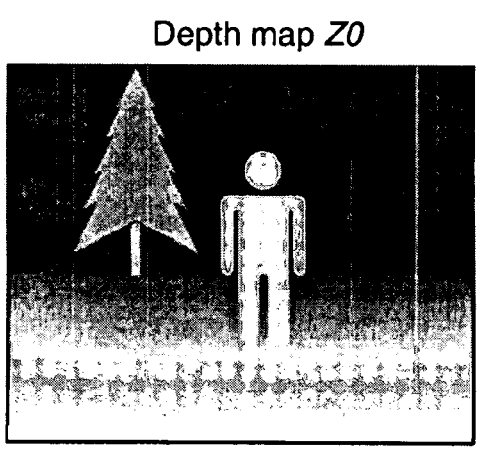
Figure 2B:
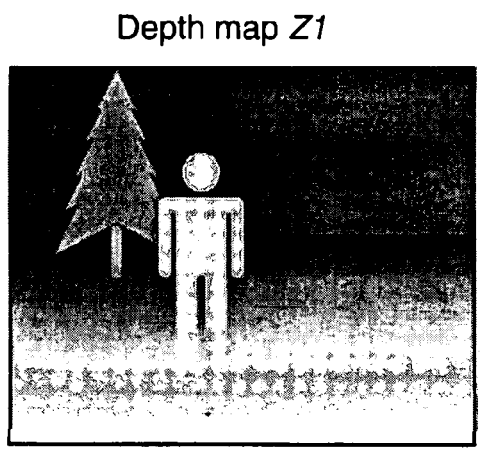
Figure 3:
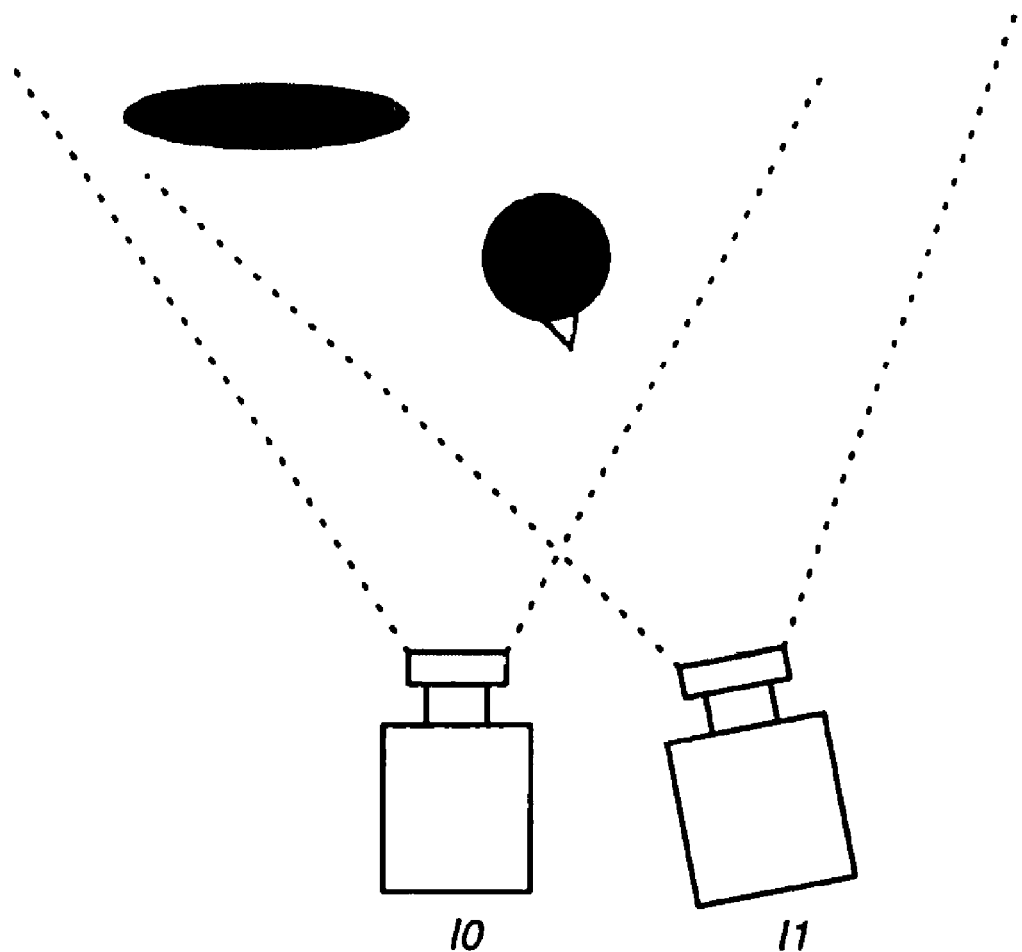
Figure 4:
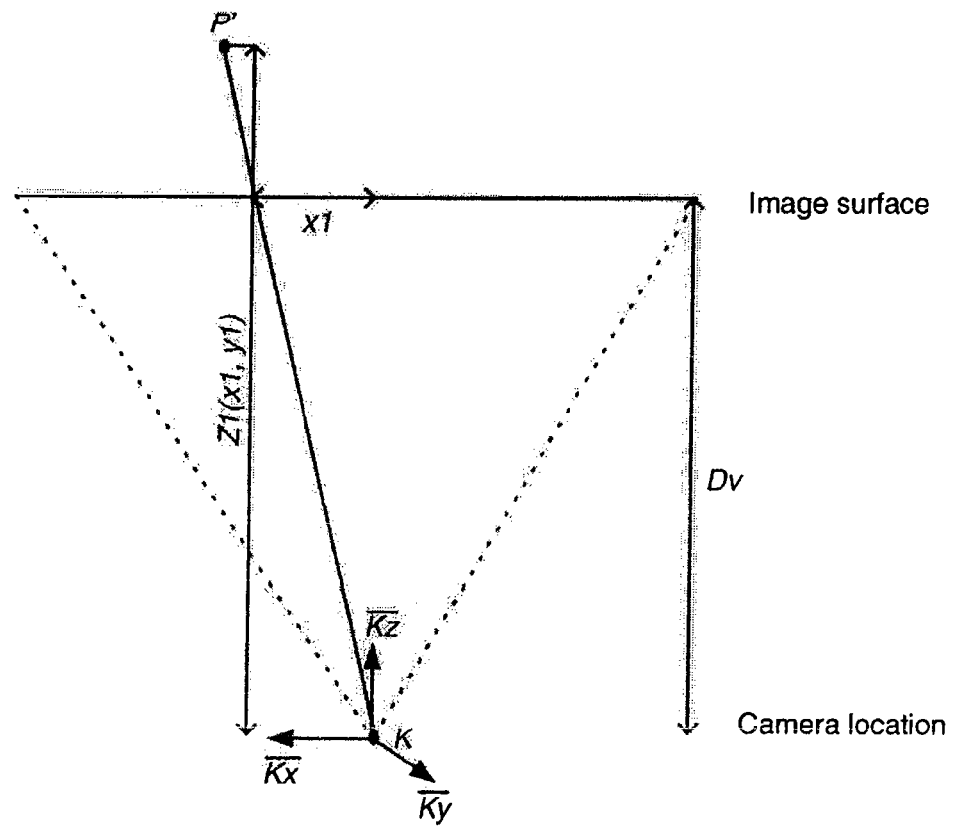
Figure 5:
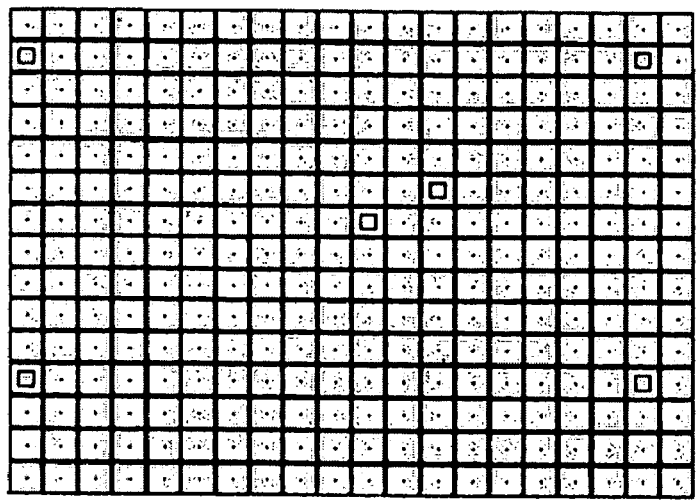
Figure 6:
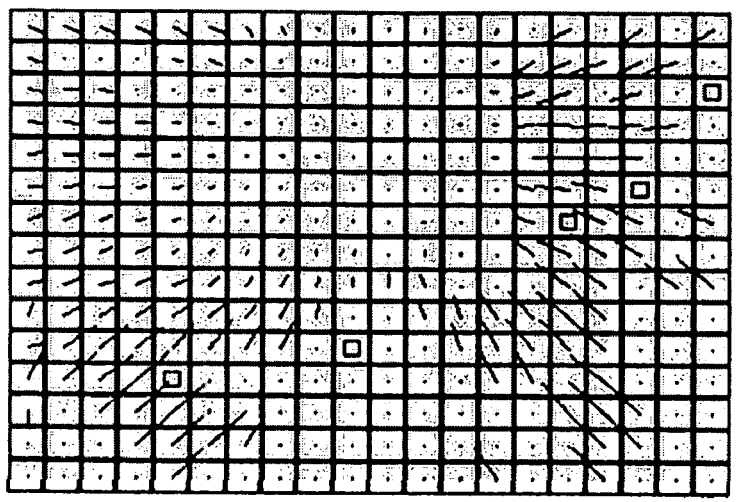
Figure 7:
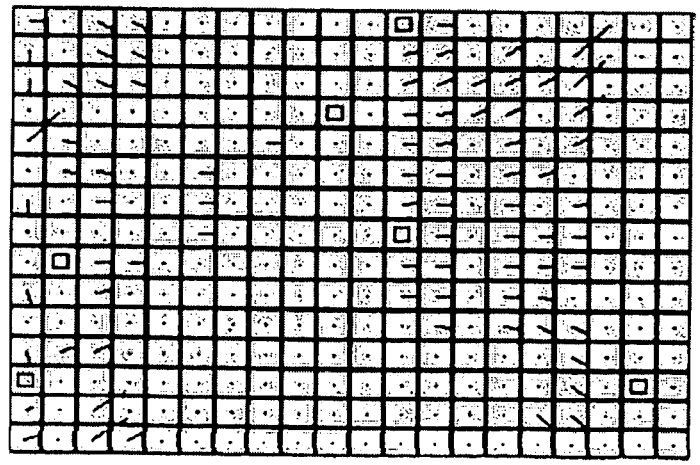
Figure 8A:
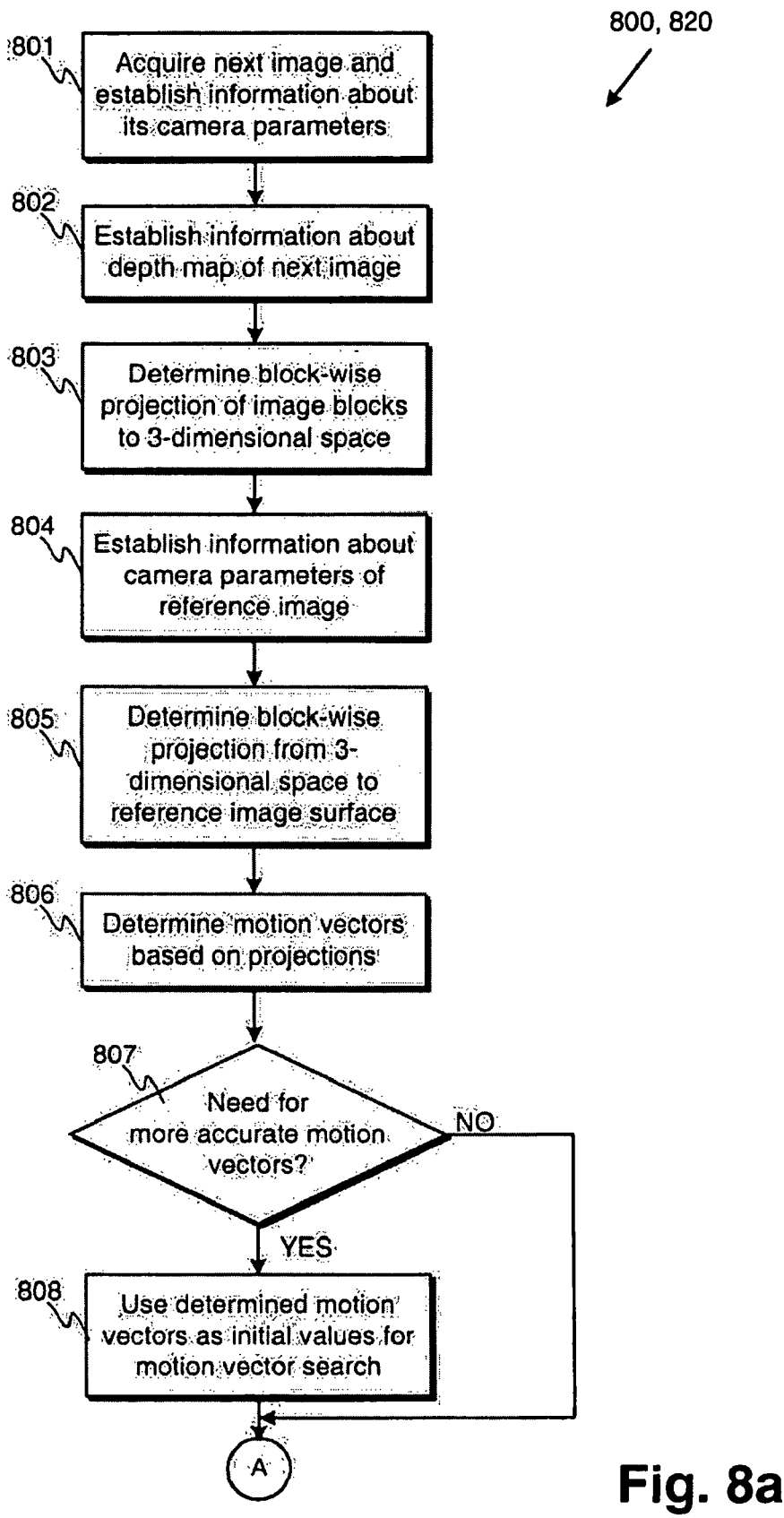
Figure 8B:
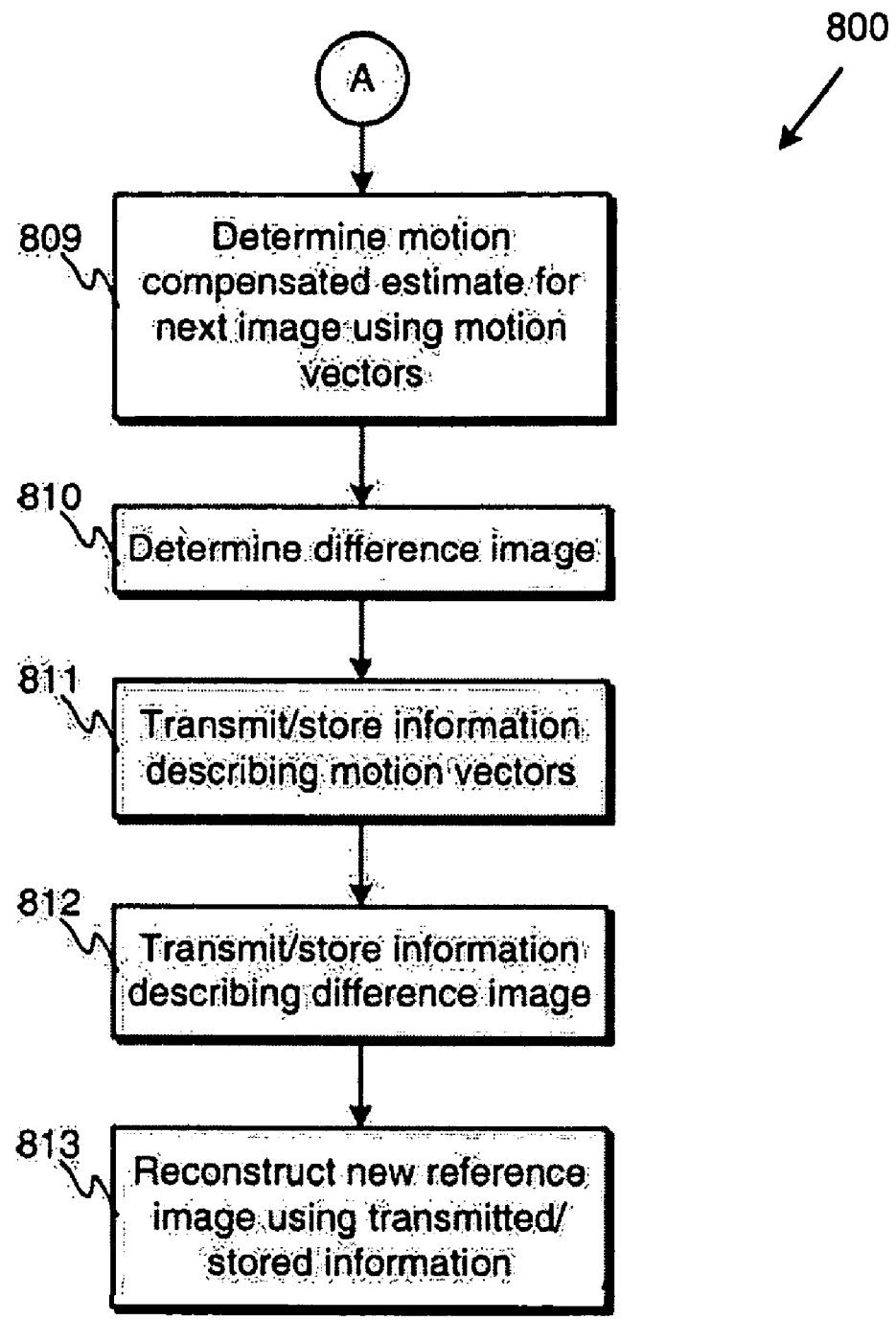
Figure 8C:
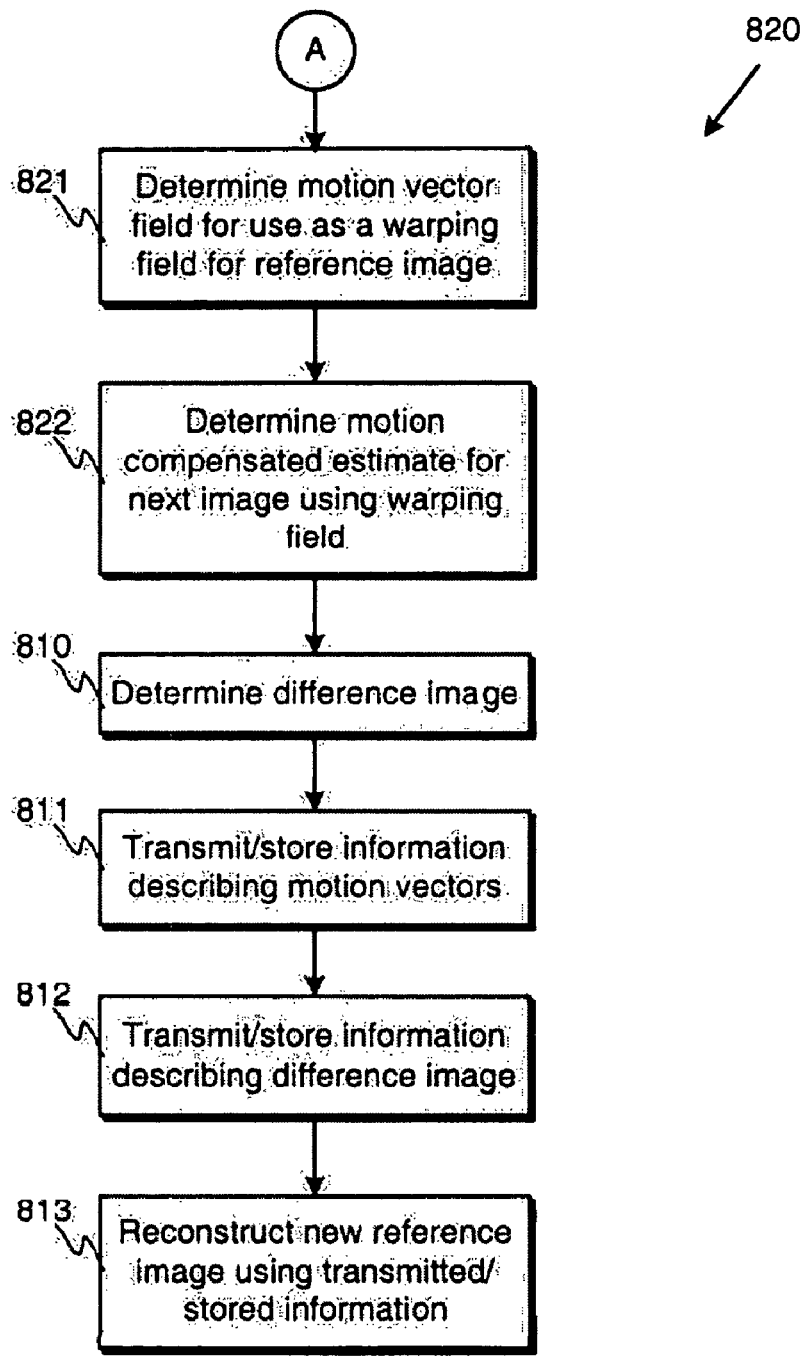
Figure 9:
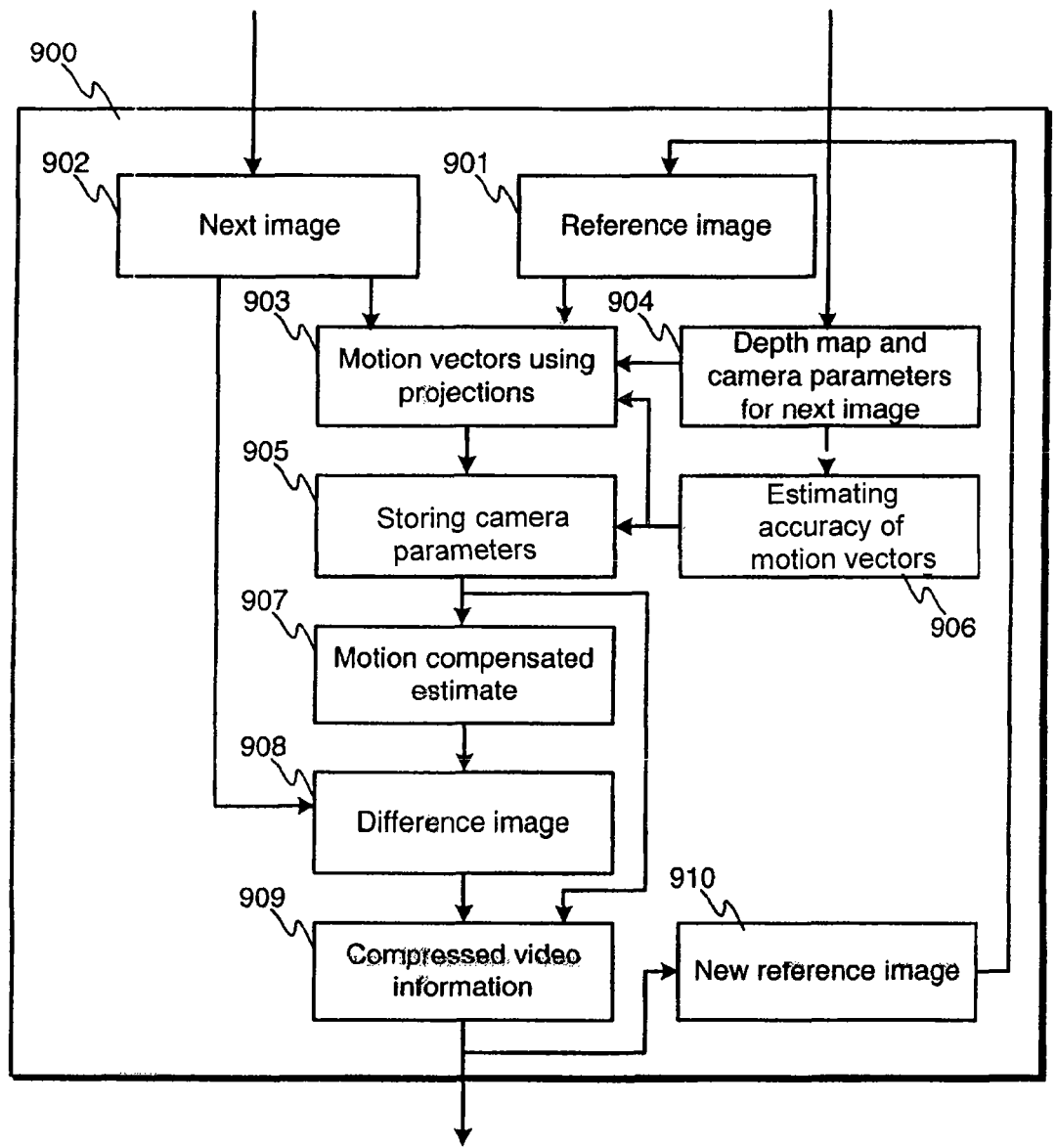

The invention is illustrated by way of example in the accompanying figures, where FIG. 1a shows an imaginary video image, FIG. 1b shows the depth map associated with the image of FIG. 1a, FIG. 2a shows a new image of the same scene where the camera has moved, FIG. 2b shows the depth map of the new video image, FIG. 3 shows the camera positions for the video images of FIGS. 1a and 2a, FIG. 4 shows the geometry relating to projecting a point in the video image can be projected back to the 3-dimensional space using the depth map information, FIG. 5 shows the application of the invention to a known computer game in a situation where the camera is stationary, FIG. 6 shows the camera moving approximately straight forward, FIG. 7 shows the camera rotating from right to left, FIGS. 8a, 8b, 8c show a flowchart of a method according to one embodiment of the invention, and FIG. 9 shows a video compressor according to a further embodiment of the invention.

The following explanation of the invention refers to FIGS. 1-4.

A method according to the invention requires the following data to start with for both the reference image and the next image being compressed: the actual image and camera parameters for the image. A depth map corresponding to the next image is also needed. A depth map is typically a 2-dimensional array of numbers that tells how far from the camera the visible object in each pixel of the actual image is.

FIGS. 1a and 2b illustrate, as examples, two video images: in FIG. 1a a video image I0 is illustrated, and in FIG. 2b a video image I1 is illustrated. The images I0 and I1 relate to a same scene, but the location and direction of the camera viewing the scene are different for images I0 and I1. FIG. 3 illustrates the location and direction of the camera for images I0 and I1.

Camera parameters for the image define camera location, camera direction and the viewing distance of the camera. Camera location K is typically presented as a point (or vector pointing to this location) in a three dimensional space. Camera direction is typically presented with three camera direction vectors Kx, Ky and Kz. Viewing distance Dv is the distance of the camera from the image plane. FIG. 4 illustrates these camera parameters K, Kx, Ky, Kz and Dv.

The x and y coordinates of points in the image plane are defined typically as distances (in the directions defined by direction vectors Kx and Ky) from the point in the image surface, where the direction defined by vector Kz intersects the image surface; typically this point is the center point of the image. FIG. 4 illustrates the above definition of coordinate x; in FIG. 4 the coordinate is marked with x1 as FIG. 4 relates especially to image I1.

FIGS. 1b and 2b illustrate depth maps Z0 and Z1 of the images I0 and I1: the darker the shade of grey, the larger the distance of the object in that point of the image from the camera. A depth map Z specifies the distance of an object O from the camera in the direction of vector Kz. FIG. 4 illustrates, how the location of the object O, which is illustrated in the image I1 in the point (x1, y1), in a three-dimensional space may be determined using x1, y1, Z1(x1,y1) and the camera parameters of image I1. In other words, FIG. 4 illustrates the projection of point (x1, y1) in the image surface to a point of the three-dimensional space P'.

When an image is a view generated from a synthetic model, the depth map Z is usually generated as a side-product of the image creation process, as discussed above. When the image is an image of the real world, it is possible to determine the depth map using for example range sensors.

Let us consider next, as an example, a situation, where the video image I0 in FIG. 1a functions as a reference image for the video image I1 illustrated in FIG. 2b. Further, as an example, let us consider an image block containing the head of the person in the images I0 and I1.

In order to compute a useful approximation for the motion vector of the block under study, we want to find out where the pixel p1 (FIG. 2a) was in the reference image I0, assuming that all changes between the images I0 and I1 are due to camera parameter changes. The previous location is called p0 (FIG. 1a). To find the x and y components of p0 (i.e. x0 and y0), the image point p1 is first projected back to the 3-dimensional space P' using the camera parameters of the image I1 (FIG. 4) and then the point of three-dimensional space is projected to the surface of the reference image I0 using the camera parameters of the reference image. The difference in the location of the point in the two images, typically defined as the signed difference p0-p1, is the motion vector for use in video compression.

The projection from the image surface I to the three-dimensional space is done with the following formula:

$$P' = K + \frac{x*Z(x,y)}{Dv} * \overline{K}x + \frac{y*Z(x,y)}{Dv} * \overline{K}y + Z(x,y) * \overline{K}z$$

where x and y are coordinates of a point in the image surface and Z(x,y) is the depth-map value of the point (x,y). The projection from three-dimensional space to the image space can be done with the formula that results from solving x, y and Z(x,y) from the above formula. Both formulas are known basic formulas of three-dimensional computer graphics. The coordinates, camera parameters and depth map may be defined in a slightly different way than those described above, but it is evident to a person skilled in the art to modify the projection formula accordingly.

The presented method of calculating the motion vector takes into account all changes in the video images that result in from changes in camera parameters. Irrespective of possible changes in the scene seen by the camera, pixels/blocks of a next image may be projected first, using the camera parameters of the next image, to the three-dimensional space and then, using the camera parameters of the reference image, to the surface of the reference image. Let us below note the point relating to a certain object in the next image with p1 and in the reference image with $p_{ref}$. The value of $p_{ref}$ is, however, typically not known when a next image is compressed—the goal of motion compensation is just to determine an estimate of $p_{ref}$.

Let us note a once projected next image point p1 with P1" (this is a point of three-dimensional space) and a twice projected point with p1" (this is a point (x1", y1") in the reference image surface, and it has a depth value z1"). If the changes in the video image in the areas, where p1 and p1" are, are caused only by changes in the camera parameters, then p1" is equal or close to $p_{ref}$. FIGS. 1-3 illustrate this case. A possible way to estimate, whether p1" is equal or close to $p_{ref}$ is to compare the depth value z1" with the reference image depth-map value Z0(x1",y1"). These values match closely, if the changes in the images are caused by camera parameter changes. In this case there typically is no need to try to find a more accurate motion vector for p1 than p1"-p1.

If the scene seen by the camera changes, projecting twice a point of the next image as described above gives non-accurate motion vectors in those areas of the image. A computationally inexpensive way for estimating whether there is possibly a need to determine more accurate motion vectors is, as describe above, to compare the depth value z1" with the depth-map value Z0(x1",y1"). If this comparison does not produce a close match, then a more accurate motion compensation vector may be determined using conventional search methods. The value p1"-p1 may be used as an initial value for these conventional motion vector search methods. In standard video compression methods, the motion vectors are usually not calculated for each pixel separately, but for fixed size blocks of e.g. 8×8 or 16×16 pixels instead. Because of this, the projection method of this invention is preferably also applied to such blocks to save computational effort. This can be done, for example, by averaging the depth values inside the block, and using the average depth value and the center x and y coordinates of the block as the point coordinates in the projection.

Each of FIGS. 5, 6 and 7 presents the motion vector fields calculated with the presented projection method for video frames from a known computer game. In this computer game the virtual camera is attached to the weapon and can be moved around and rotated at the players will. The figures present video frames from the game divided into blocks that are used in the motion estimation process. FIG. 5-7 present video frames for the game, the video frames being divided into blocks.

In FIG. 5 the camera is stationary and the motion vectors computed using projection method are thus not present. FIG. 6 shows a situation where the player is moving forward, and FIG. 7 shows the player rotating from right to left. As can be seen from FIGS. 5-7, the motion vectors generated using the described projection method give a rather intuitive view of the motion.

Instead of being used as input data for block-based video compression, the motion vectors calculated using the described projection method can alternatively be used as a reference image warping field. Typically motion vectors for each pixel in the reference image are calculated by (e.g. bilinear) interpolation of the block-based vector field. Alternatively, it is possible to generate the motion vector field projecting the pixels pixel-by-pixel. Utilizing this method of course requires the transmission/storage of information describing the motion vector field together with the compressed data. If reference image warping is done both at the image compression and at the image decompression, the part of the actual image compression algorithm is to correct the difference between a warped reference image and the next image.

Using the warp method is beneficial for the compression ratio and video quality, because it enlarges the set of operations that can be expressed with the motion vectors. When in normal block-based video compression, the only operation that can be used to build a next image from the reference image is a translated block copy, the warp method correctly reproduces scaling and rotation of the image resulting from camera movement. Finding the rotation and scaling parameters with conventional iterative search methods would make video compression prohibitively computationally expensive, since they effectively add two new dimensions into the search space.

FIG. 8 illustrates, as two examples, flowcharts of video compression methods 800 and 820 according to two embodiments of the invention. In step 801, a next image is received and information about the camera parameters of the next image is established. In step 802 information about depth map of the next image is established. In step 803, blocks of the next images are projected to the three-dimensional space using the camera parameters and depth map of the next image. In step 804 information about the camera parameters of the reference image is established, and in step 805 the points projected to the three-dimensional space are projected to the reference image surface.

In step 806 motion vectors are determined using the results of the projection, as described above. In step 807 it is determined, whether the camera-parameter related motion vectors are accurate enough. This can be done, as discussed above, by comparing the reference image depth-map value Z0(x1",y1") to the depth value z1" of the twice projected image point p1". Typically a threshold value for the difference is determined, and if the depth-map values are sufficiently close to each other, there is no need for more accurate motion vectors. In step 808, if needed, more accurate motion vectors are searched using the camera-parameter related motion vectors are as initial values; here any method for searching motion compensation vectors is applicable. The search is preferably made only in those areas of the image, where the motion vectors were not accurate enough.

FIG. 8b illustrates, how video compression method 800 continues. In this method the motion vectors are used in a conventional way in image compression. In step 809 a motion compensated estimate for the next image is determined using the motion vectors. Thereafter, in step 810, a difference image is determined using the next image and the motion compensated estimate. In step 811 information describing the motion vectors is transmitted and/or stored for further use. In step 812, information describing the difference image is transmitted/stored. In step 813 a new reference image is generated using the transmitted/stored information; a new reference image may be generated relating to each compressed image or a same reference image may be used for a number of compressed images. Thereafter method 800 continues from step 801.

FIG. 8c illustrates, how method 820 continues. In method 820 a motion vector field is determined in step 821. As discussed above, one possible way to determine a motion vector field is to interpolate pixel-specific values from block-specific motion vectors. In step 822 a motion compensated estimate of the next image is determined using the motion vector field as warping field. Thereafter method 820 continues similarly as method 800.

In the rim of the image, where new material typically enters into view, the motion compensated estimate is inaccurate. This situation can be observed, as a motion vector calculated according to the presented method points outside the reference image. The difference image, however, takes care of the inaccuracy in the motion compensated estimate also in this case.

FIG. 9 illustrates, as an example, schematically a block diagram of a video compressor 900 according to one embodiment of the invention. The video compressor has means 901 for storing a reference image, means 902 for receiving a next image, and means 903 for determining motion vectors for estimating changes between the next image and the reference image. It furthermore comprises means 904 for establishing information about a depth map and camera parameters of the next image and means 905 for storing camera parameters of the reference image. Means 904 may be, for example, arranged to receive distance information from a range sensor or to receive/fetch information from a memory of a 3-D display controller. The means 903 for determining motion vector estimates is arranged to calculate projection of points of the next image to a three-dimensional space and projection of points in a three-dimensional space to the reference image.

A video compressor may further comprise means for storing information about a depth map of the reference image (may be implemented using same memory means 905, which are used in storing the camera parameters) and means 906 for estimating the accuracy of the motion vectors. The means for estimating accuracy of the motion vectors may be arranged to determine, when needed, more accurate motion vectors by conventional searching methods.

A video compressor typically further comprises means 907 for constructing a motion compensated estimate for the next image and means 908 for determining a difference image between the next image and the motion compensated estimate. The means 907 for constructing a motion compensated estimate may be arranged to use motion vectors or, alternatively, it may be arranged to construct a motion vector field and to warp a reference image in accordance with the motion vector field.

Furthermore, it typically comprises means 909 for transmitting/storing information describing the motion vectors and the difference image. Means 910 for constructing a new reference image using the transmitted/stored information is typically also part of a video compressor.

A device or computer program according to the invention may be arranged to function according to any method according to the invention.

The described method opens up new possibilities for the use of compressed video, because the processor and other resources, which are typically required by conventional motion compensation video compression, cause prohibitive requirements to be posed on equipment by real-time video compression. The computational power that would otherwise be necessary to real-time compress video streams can now be used to enhance the quality of the result, to compress multiple simultaneous video streams or, where suitable, to perform other tasks simultaneously with the image compression.

In view of the foregoing description, it will be evident to a person skilled in the art that various modifications may be made within the scope of the invention. While some preferred embodiments of the invention have been described in detail, it should be apparent that many modifications and variations thereto are possible, all of which fall within the scope of the invention as defined by the appended independent claims.

The invention claimed is:

1. A device for motion compensated compression of a video sequence, comprising:
   a first storage block which stores a reference image included in the video sequence,
   a receiving block which receives a next image included in the video sequence, and
   a determination block for determining a plurality of motion vectors, whereby each motion vector corresponds to a next point in a next image surface corresponding to the next image, for estimating changes between the next image and the reference image,
   a compression block which compresses the video sequence using the motion vectors,
   an establishment block for establishing information about a first depth map and first camera parameters corresponding to the next image, and
   a second storage block for storing information about second camera parameters corresponding to the reference image, wherein
   the determination block is further arranged to determine each motion vector corresponding to a next point in the next image surface by:
      projecting the next point to a projected point in a three-dimensional space using the first depth map and first camera parameters,
      projecting the projected point to a reference point included in a reference image surface corresponding to the reference image using the second camera parameters,
      determining an estimated vector corresponding to the next point based on a location of the next point in the next image and a location of the reference point in the reference image, and
      determining the motion vector corresponding to the next point using the estimated vector.

2. A device according to claim 1, further comprising
a first block storing which stores information about a second depth map corresponding to the reference image and
a second block which estimates the accuracy of the estimated vector by comparing a depth between the projected point and the reference point with a depth value obtained from the second depth map.

3. A device for motion compensation compression of a video sequence comprising:
a first block which projects next points in a next image surface corresponding to a next image included in the video sequence to projected points in a three-dimensional space using camera parameters and a depth map corresponding to the next image,
a second block which projects the projected points to reference points included in a reference image surface corresponding to a reference image included in the video sequence, thereby obtaining estimated vectors corresponding to locations of the next points in the next image and locations of the reference points in the reference image, wherein the depth-map is derived from a depth map residing in the memory of a 3D graphics display adapter controller of a computer,
wherein the video sequence is generated by said 3D display graphics adapter, and
the device is configured to compress the video sequence using the estimated vectors.

4. A device for motion compensation compression of a video sequence, comprising:
means for storing a reference image included in the video sequence,
means for receiving a next image included in the video sequence,
means for determining a plurality of motion vectors, whereby each motion vector corresponds to a next point in a next image surface corresponding to the next image, for estimating changes between the next image and the reference image,
means for establishing information about a first depth map and first camera parameters corresponding to the next image,
means for storing information about second camera parameters corresponding to the reference image,
wherein the means for determining the plurality of motion vector is further configured to determine each motion vector corresponding to a next point in the next image surface by:
projecting the next point to a projected point in a three-dimensional space using the first depth map and first camera parameters,
projecting the projected point to a reference point included in a reference image surface corresponding to the reference image using the second camera parameters of the reference image,
determining an estimated vector corresponding to the next point based on a location of the next point in the next image and a location of the reference point in the reference image, and
determining the motion vector corresponding to the next point using the estimated vector.

5. A device for motion compensation compression of a video sequence, comprising:
means for projecting next points in a next image surface corresponding to a next image included in the video sequence to projected points in a three-dimensional space using camera parameters and a depth map corresponding to the next image;
means for projecting the projected points to reference points included in a reference image surface corresponding to a reference image included in the video sequence, thereby obtaining estimated vectors corresponding to locations of the next points in the next image and locations of the reference points in the reference image, wherein the depth-map is derived from a depth map residing in the memory of a 3D graphics display adapter controller of a computer; and
wherein the video sequence is generated by said 3D display graphics adapter; and
the device is configured to compress the video sequence using the estimated vectors.

6. A computer, comprising the device according to claim 1.

7. A computer according to claim 6, wherein the computer further comprises a computer game.

8. A device according to claim 1, wherein
the first depth map is derived from a depth map residing in the memory of a 3D display graphics adapter controller of a computer; and
the video sequence is generated by the 3D display graphics adapter controller.

9. A method for compressing a video sequence comprising:
receiving a next image included in the video sequence, first camera parameters corresponding to the next image, and a first depth map corresponding to the next image;
receiving a reference image included in the video sequence and second camera parameters corresponding to the reference image;
generating a plurality of motion vectors, whereby each motion vector corresponds to a next point in a next image surface corresponding to the next image, and is generated by steps comprising:
projecting the next point to a projected point in a three-dimensional space using the first camera parameters and the first depth map,
projecting the projected point to a reference point included in a reference image surface corresponding to the reference image using the second camera parameters,
determining an estimated vector corresponding to the next point based on a location of the next point in the next image and a location of the reference point in the reference image,
generating the motion vector corresponding to the next point using the estimated vector; and
compressing the video sequence using the plurality of motion vectors.

10. A method according to claim 9, wherein
the first depth map is derived from a depth map residing in the memory of a 3D display graphics adapter controller of a computer; and
the video sequence is generated by the 3D display graphics adapter controller.

11. A method according to claim 9, further comprising:
receiving a second depth map corresponding to the reference image; and
wherein the steps for generating each motion vector further comprise:
estimating the accuracy of the estimated vector by comparing a depth between the projected point and the reference point with a depth value obtained from the second depth map.

12. A method according to claim 11, wherein the steps for generating each motion vector further comprise:

using the estimated vector as the motion vector or performing a motion vector search using the estimated vector as an initial value, depending on the estimated accuracy of the estimated vector.

13. A method according to claim 9, further comprising:
determining a motion compensated estimate for the next image by using the plurality of motion vectors.

14. A method according to claim 9, wherein each motion vector has a separate corresponding fixed-size image block.

15. A method according to claim 14, wherein the steps for generating each motion vector further comprise:
obtaining an average depth value from the first depth map for the image block corresponding to the motion vector; and the next point corresponds to the center of the image block corresponding to the motion vector.

16. A tangible computer readable medium comprising a plurality of instructions which, when executed by a computer, cause the computer to perform the method of claim 9.

* * * * *